United States Patent
Switkes et al.

(10) Patent No.: US 9,090,285 B2
(45) Date of Patent: Jul. 28, 2015

(54) METHOD FOR PROVIDING A LANEKEEPING ASSISTANCE BASED ON MODIFYING MECHANICAL SOURCES OF STEERING TORQUES

(75) Inventors: Joshua Switkes, Menlo Park, CA (US); Arne Stoschek, Palo Alto, CA (US)

(73) Assignee: Volkswagen Group of America, Inc., Herndon, VA (US)

( * ) Notice: Subject to any disclaimer, the term of this patent is extended or adjusted under 35 U.S.C. 154(b) by 1302 days.

(21) Appl. No.: 12/328,863

(22) Filed: Dec. 5, 2008

(65) Prior Publication Data

US 2010/0145575 A1      Jun. 10, 2010

(51) Int. Cl.
*A01B 69/00* (2006.01)
*B62D 15/02* (2006.01)

(52) U.S. Cl.
CPC .................................. *B62D 15/025* (2013.01)

(58) Field of Classification Search
CPC .. B62D 7/159; B62D 15/0215; B62D 5/0463; B62D 6/008; G08G 1/16; B60T 8/1755; B60W 50/14
USPC ......................................... 701/1, 7, 8, 23, 41
See application file for complete search history.

(56) References Cited

U.S. PATENT DOCUMENTS

| | | | |
|---|---|---|---|
| 5,347,458 A | 9/1994 | Serizawa et al. | |
| 5,373,911 A * | 12/1994 | Yasui | 180/168 |
| 5,398,953 A * | 3/1995 | Shimizu | 180/446 |
| 5,485,378 A | 1/1996 | Franke et al. | |
| 6,640,923 B1 | 11/2003 | Dominke et al. | |
| 6,768,283 B2 * | 7/2004 | Tanaka et al. | 318/632 |
| 6,778,890 B2 * | 8/2004 | Shimakage et al. | 701/41 |
| 7,295,682 B2 | 11/2007 | Otsuka et al. | |
| 2007/0219688 A1 | 9/2007 | Gut et al. | |
| 2007/0233343 A1 * | 10/2007 | Saito et al. | 701/41 |
| 2008/0239734 A1 * | 10/2008 | Ibrahim et al. | 362/460 |

FOREIGN PATENT DOCUMENTS

| | | |
|---|---|---|
| DE | 4332836 C1 | 9/1994 |
| DE | 10032340 A1 | 1/2002 |
| DE | 10312513 A1 | 9/2004 |
| DE | 10351654 A1 | 6/2005 |
| DE | 102004023546 A1 | 12/2005 |

(Continued)

OTHER PUBLICATIONS

Author name:—Joshua P. Switkes, Title:—Handwheel Force Feedback With Lanekeeping Assistance Combined Dynamics, Stability and Bounding, Publish Date:—Nov. 2006.*

(Continued)

*Primary Examiner* — Tuan C. To
*Assistant Examiner* — Shardul Patel
(74) *Attorney, Agent, or Firm* — Manfred Beck, P.A.

(57) ABSTRACT

A method for providing a lanekeeping assistance for a vehicle includes determining road lane characteristics such as a road lane curvature. A vehicle velocity and a vehicle position with respect to a road lane are also determined. A desired steering angle is determined as a function of at least the road lane characteristics. A lanekeeping torque acting on the steering system of the vehicle in order to keep the vehicle on a desired path is determined as a function of at least the desired steering angle. The lanekeeping torque is generated by modifying at least one mechanical steering torque such as a jacking torque, an aligning torque, an inertia torque and a damping torque.

18 Claims, 3 Drawing Sheets

(56) References Cited

FOREIGN PATENT DOCUMENTS

| | | |
|---|---|---|
| EP | 1301387 B1 | 3/2006 |
| WO | 0202389 A1 | 1/2002 |
| WO | 2004083014 A1 | 9/2004 |
| WO | 2005110826 A1 | 11/2005 |
| WO | WO 2008077668 A1 * | 7/2008 |

OTHER PUBLICATIONS

Author name:—Joshua P. Switkes Title:—Handwheel Force Feedback With Lankeeping Assistance Combined Dynamics, Stability and Bounding publish date :—Nov. 2006.*

* cited by examiner

METHOD FOR PROVIDING A LANEKEEPING ASSISTANCE BASED ON MODIFYING MECHANICAL SOURCES OF STEERING TORQUES

FIELD OF THE INVENTION

The invention relates to a method for providing a lanekeeping assistance by modifying steering torques.

BACKGROUND OF THE INVENTION

Lanekeeping assistance systems are generally developed for the purpose of improving safety and driving comfort. These systems are for example designed to detect and prevent an unintended lane departure of a vehicle. Lanekeeping assistance systems sense a vehicle's position in a road lane and, in response to the detected position of the vehicle, apply a torque to the steering wheel. The torque that is applied to the steering wheel helps the driver keep the vehicle in the road lane and avoids an unintentional drifting out of the road lane. The tasks that must be performed by a lanekeeping assistance system include the task of sensing a road lane position and the task of providing a feedback torque to the driver. The task of sensing the road lane position of the vehicle can be performed in a satisfactory manner by a number of conventional methods. The road lane position is typically sensed by detecting lane markers on the road that bound the lanes. In this case, a video camera captures an image of the lane markers. The image is then processed to extract the lane markers from the image. U.S. Pat. No. 7,295,682 B2 describes an exemplary embodiment of a lane recognition system. Lane departure warning systems that perform a lane sensing function are for example commercially available under the trademark names SAFE-TRAC, MOBILEYE and AUTOVUE.

Unlike the task of sensing the lane position, which can be performed satisfactorily with conventional methods, the task of applying a torque to the steering system for providing a lanekeeping assistance in such a way that the vehicle motion is smooth and acceptable to the driver and in such a way that the steering system feels comfortable to the driver has so far not yet been solved in a satisfactory manner.

Conventional lanekeeping assistance systems usually do not achieve the objectives of providing a smooth control and a satisfactory interaction with the driver. Formal control techniques may be used to control a vehicle in the absence of a driver, but these solutions by definition try to remove the influences of disturbances. These formal control techniques essentially treat a driver's steering wheel movement as a disturbance that is to be compensated or eliminated. As a result, solutions that try to remove the influence of the driver or try to override a driver input feel disruptive to the driver. Other solutions have looked at the interaction with the driver and have limited the amount of steering torque to be added or have made other allowances to avoid conflicts with the driver. For example, German Patent Application Publication No. DE 103 12 513 A1 discloses a lanekeeping assistance system which provides a steering torque that is added to the torque generated by the driver. The amount of steering torque that is added is limited automatically in case of fast steering movements by the driver. The steering torque can also be limited by the driver by turning a rotary knob. A disadvantage of limiting the added steering torque is that the thus limited steering torque may not adequately control the vehicle.

SUMMARY OF THE INVENTION

It is accordingly an object of the invention to provide a method for providing a lanekeeping assistance which overcomes the above-mentioned disadvantages of the heretofore-known methods of this general type and which applies a torque to the steering system in such a way that the control is smooth and does not feel disruptive or intrusive. A further object of the invention is to provide a lanekeeping assistance that results in a steering feel that is similar to the steering feel of conventional steering systems that do not have a lanekeeping assistance function. Another object of the invention is to increase driver acceptance of a lanekeeping assistance system by reducing the intrusiveness of the lanekeeping assistance torques. An additional object of the invention is to provide a lanekeeping assistance that is capable of adequately controlling the vehicle without feeling unpredictable or erratic.

With the foregoing and other objects in view there is provided, in accordance with the invention, a method for providing a lanekeeping assistance that includes the following steps:

determining road lane characteristics;

determining a vehicle velocity and a vehicle position;

determining a desired steering angle as a function of at least the road lane characteristics;

providing a lanekeeping torque acting on a steering system of a vehicle as a function of at least the desired steering angle; and generating the lanekeeping torque by modifying at least one mechanical steering torque selected from the group of a jacking torque, an aligning torque, an inertia torque and a damping torque.

An advantage of modifying mechanical sources of steering torques is that the torque control is smooth and predictable. Even when a lanekeeping torque acts on the steering wheel in order to keep the vehicle on an intended or desired path, the steering feel is essentially like the steering feel of a regular steering system. As a result, drivers are more likely to accept a lanekeeping assistance based on the method of the invention as opposed to a conventional lanekeeping assistance whose lanekeeping torques may be perceived as unpredictable and intrusive, trying to override the driver's steering operation.

Another mode of the invention includes determining the road lane characteristics by at least determining a road lane curvature. The road lane curvature can for example be determined by evaluating road lane markings that are captured with a forward-facing camera mounted in the vehicle.

A further mode of the invention includes determining the desired steering angle as a function of at least the road lane characteristics, the vehicle velocity and the vehicle position with respect to a road lane.

In accordance with another mode of the invention, the step of determining a vehicle position includes determining a lateral error as a distance between a center of gravity of the vehicle and a desired path of the vehicle and determining a heading angle as an angle between a longitudinal axis of the vehicle and the desired path of the vehicle.

Yet another mode of the invention includes using a road lane centerline as the desired path of the vehicle.

Another mode of the invention includes generating the lanekeeping torque such that the steering system of the vehicle guides the vehicle substantially along a desired path.

Another mode of the invention includes measuring a steering angle of front wheels of the vehicle; and determining the jacking torque as a substantially linear function of the steering angle.

Another mode of the invention includes determining the jacking torque by using the following relation:

$$\tau_{jack} = -K_{jack}\delta$$

wherein $\tau_{jack}$ denotes the jacking torque, $K_{jack}$ is a property of a steering geometry of the steering system and $\delta$ denotes the steering angle of the front wheels of the vehicle; centering the jacking torque on the desired steering angle in accordance with the following relation:

$$\tau_{jack_{des}} = -K_{jack}(\delta - \delta_{des})$$

wherein $\tau_{jack_{des}}$ denotes a desired jacking torque and $\delta_{des}$ denotes the desired steering angle of the front wheels of the vehicle such that the desired jacking torque is substantially zero if the steering angle substantially matches the desired steering angle and such that an additional jacking torque is generated in accordance with the following relation:

$$\tau_{jack_{add}} = K_{jack}\delta_{des}$$

wherein $\tau_{jack_{add}}$ is the additional jacking torque to be added in order to center the jacking torque on the desired steering angle.

Another mode of the invention includes measuring a steering angle of front wheels of the vehicle; determining an aligning torque by using the following relation:

$$\tau_{align} = -K_{align}(\dot{e}/U_x - \psi + ar/U_x - \delta)$$

wherein $\tau_{align}$ denotes the aligning torque, $K_{align}$ is a function of steering parameters, $\dot{e}$ denotes a sideways velocity of the vehicle relative to a road lane, $U_x$ denotes a longitudinal speed of the vehicle, $\psi$ denotes a heading angle as an angular difference between a longitudinal axis of the vehicle and a desired path, a is a distance between a front axle of the vehicle and a center of gravity of the vehicle, r denotes a yaw rate of the vehicle and, and $\delta$ denotes the steering angle.

Another mode of the invention includes centering the aligning torque on the desired steering angle, a desired heading angle, and a desired yaw rate in accordance with the following relation:

$$\tau_{align_{des}} = -K_{align}(\dot{e}/U_x - (\psi - \psi_{des}) + a(r - r_{des})/U_x - (\delta - \delta_{des}))$$

wherein $\tau_{align_{des}}$ is a desired aligning torque, $\psi_{des}$ denotes the desired heading angle, $r_{des}$ denotes the desired yaw rate of the vehicle, and $\delta_{des}$ denotes the desired steering angle.

Another mode of the invention includes calculating an additional aligning torque by using the following relation:

$$\tau_{align_{add}} = -K_{align}(\psi_{des} + ar_{des}/U_x - \delta_{des})$$

wherein $\tau_{align_{add}}$ is the additional aligning torque to be added for providing a lanekeeping assistance.

Another mode of the invention includes determining the desired yaw rate in accordance with the following relation:

$$r_{des} = \delta_{des} U_x / L$$

wherein L is a distance between the front axle of the vehicle and a rear axle of the vehicle.

Another mode of the invention includes determining the desired heading angle by using the following relation:

$$\psi_{des} = -\frac{C_f[bLC_r - amv^2]}{L^2 C_f C_r - (aC_f - bC_r)mv^2}\delta_{ff}$$

wherein $C_f$ is a cornering stiffness of front wheels of the vehicle, $C_r$ is a cornering stiffness of rear wheels of the vehicle, L is a distance between the front axle of the vehicle and a rear axle of the vehicle, b is a distance between the center of gravity of the vehicle and a rear axle of the vehicle, m is a total mass of the vehicle, v is a velocity of the vehicle and $\delta_{ff}$ is a feedforward component of a steering angle correction.

Another mode of the invention includes measuring a steering angle of front wheels of the vehicle; determining an inertia and damping torque acting on the steering system of the vehicle by using the following relation:

$$\tau_{effective} = -I_s \ddot{\delta} - C_s \dot{\delta}$$

wherein $\tau_{effective}$ is the inertia and damping torque resulting from an inertia of masses of the steering system and resulting from friction in the steering system, $I_s$ and $C_s$ are parameters defining characteristics of an inertia and, respectively, a damping of the steering system and $\delta$ is the steering angle of the front wheels of the vehicle.

A further mode of the invention includes determining a desired inertia and damping torque such that an inertia and damping torque acting on a steering wheel of the vehicle is substantially eliminated when the steering wheel turns at a desired rate.

Another mode of the invention includes calculating the desired inertia and damping torque by using the following relation:

$$\tau_{ID_{des}} = -I_s(\ddot{\delta} - \ddot{\delta}_{des}) - C_s(\dot{\delta} - \dot{\delta}_{des})$$

wherein $\tau_{ID_{des}}$ is the desired inertia and damping torque and $\delta_{des}$ is a desired steering angle.

Another mode of the invention includes calculating an additional inertia and damping torque by using the following relation:

$$\tau_{ID_{add}} = I_s \ddot{\delta}_{des} + C_s \dot{\delta}_{des}$$

wherein $\tau_{ID_{add}}$ is the additional inertia and damping torque to be added in order to substantially eliminate an inertia and damping torque acting on the steering wheel of the vehicle when the steering wheel turns at a desired rate.

Yet another mode of the invention includes calculating an additional steering torque $\tau_{add}$ by adding a number of steering torque components wherein the steering torque components collectively keep the vehicle close to a desired path and wherein the steering torque components include at least an additional jacking torque component $\tau_{jack_{add}}$, an additional aligning torque component $\tau_{align_{add}}$ and an additional inertia and damping torque component $\tau_{ID_{add}}$.

Although the invention is illustrated and described herein as embodied in a method for providing a lanekeeping assistance based on modifying mechanical sources of steering torques, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
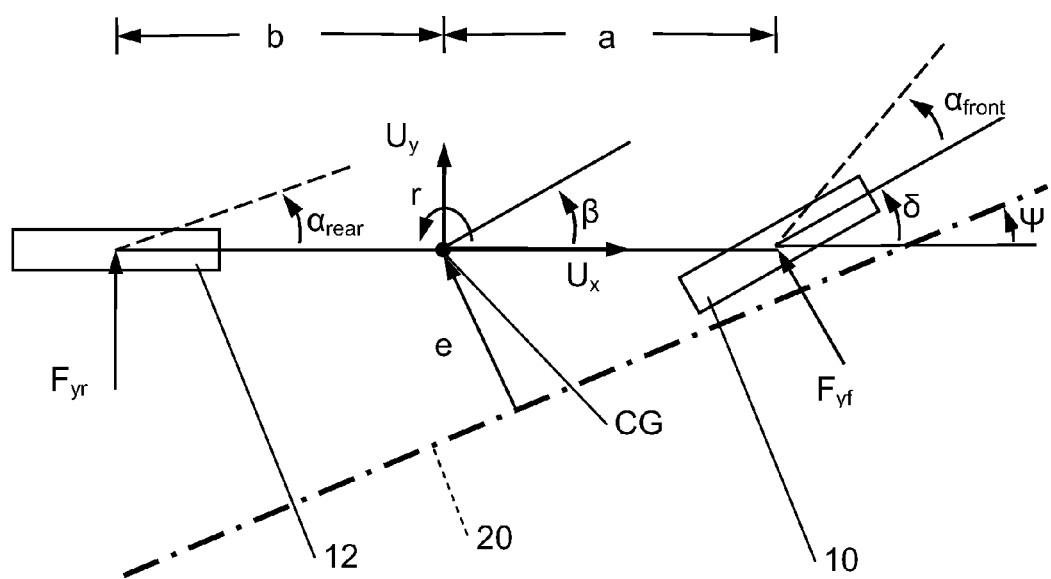
FIG. 1 is a diagram of a planar single-track model for a vehicle for illustrating coordinates, velocities and angles defining an orientation of the vehicle with respect to a road lane and the state of the motion of the vehicle in accordance with the invention.

Referring now to the figures of the drawings in detail and first, particularly, to FIG. 1 thereof, there is shown a diagram of a planar single-track model for a vehicle for illustrating the coordinates, velocities and angles that are used when describing vehicle dynamics. The single-track vehicle model shown in FIG. 1 groups the left front tire and the right front tire of the vehicle into a front tire 10. The left rear tire and the right rear tire of the vehicle are grouped into a rear tire 12. $F_{yr}$ and $F_{yf}$ are lateral tire forces, i.e. the resultant forces acting on the front tire 10 and the rear tire 12. The wheel slip angle of the rear tire 12 is denoted by $\alpha_{rear}$. The wheel slip angle of the front tire 10 is denoted by $\alpha_{front}$. The wheel slip angle $\alpha$ is the angle between the orientation of the tire and the velocity vector of the tire. The distance between the center of gravity CG of the vehicle and the front axle of the vehicle is indicated by a distance a. The steering angle $\delta$ is the angle between the orientation of the front wheel 10 and the longitudinal axis of the vehicle. The distance between the center of gravity CG of the vehicle and the rear axle of the vehicle is indicated by a distance b. The vehicle velocity is indicated by a longitudinal velocity $U_x$ and a lateral velocity $U_y$. The rotation of the vehicle about its vertical axis is indicated by a yaw rate r. The body sideslip angle $\beta$ is the angular difference between the direction of the longitudinal axis of the vehicle and the movement direction of the center of gravity CG of the vehicle. The center of the lane the vehicle is driving in is indicated by a lane centerline 20. The orientation of the vehicle with respect to the lane centerline 20 is defined by a lateral error e and by the heading error or heading angle $\Psi$.

Figure 2:
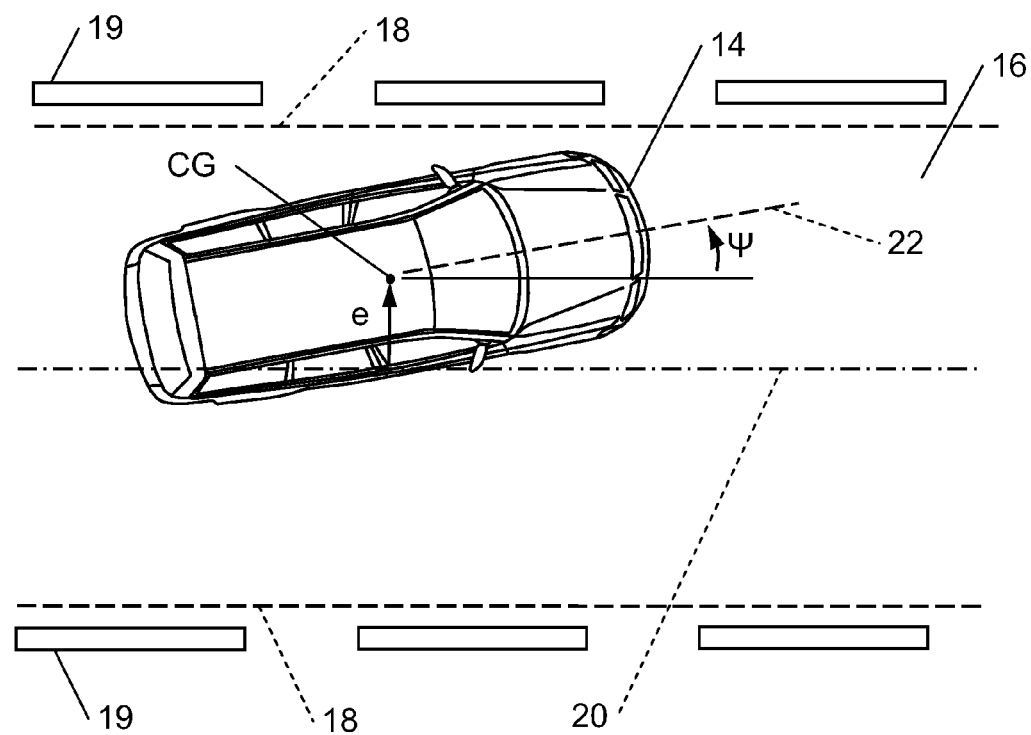
FIG. 2 is a top plan view of a vehicle on a road for illustrating coordinates and angles defining an orientation of the vehicle with respect to a road lane in accordance with the invention.

FIG. 2 is a top plan view of a vehicle 14 on a road for illustrating coordinates and angles related to vehicle dynamics. The vehicle 14 drives in a lane 16 which has imaginary boundaries indicated by dashed lines 18. Lane markers 19 are painted on the road. The lane centerline 20, which is also an imaginary line, is indicated by a dash-dotted line 20. The lateral error e, which is in this case the distance between the lane centerline 20 as a desired path for the vehicle and the center of gravity CG of the vehicle 14, is indicated with an arrow. The heading angle $\Psi$ is shown as the angle between the lane centerline 20 and the direction of the longitudinal axis 22 of the vehicle 14. In a more general case, for example when there is an obstacle on the road, a desired path may be different the road centerline 20. The lateral error e would then be the distance between the desired path and the center of gravity of the vehicle and the heading angle $\Psi$ would be the angle between the desired path and the direction of the longitudinal axis of the vehicle.

As mentioned above, lanekeeping assistance systems sense a vehicle's position in the lane and, in response to the detected position of the vehicle, apply a torque to the steering column or the steering wheel. The torque that is applied to the steering wheel helps the driver to keep the vehicle within the boundaries that define the lane 16. In order to apply a torque to the steering system in such a way that the vehicle motion is smooth and acceptable to the driver and such that the steering system feels comfortable to the driver, the present invention teaches providing a torque on the steering wheel such that the torque is a modified form of a torque that is present in a conventional vehicle equipped with a conventional mechanical steering. Since the driver is familiar with torques occurring while driving a vehicle equipped with a conventional mechanical steering system, any lanekeeping assistance torque that is additionally applied to the steering wheel does not feel disruptive or intrusive. In conventional vehicles, there are torques resulting from the forces between the road and the tires, torques resulting from the mechanical setup of the steering system and torques resulting from the inertia of masses and torques as a result of friction in the steering system. In accordance with the invention, a lanekeeping assistance system is configured such that the torque that is present in a conventional steering system is modified so that the modified torque centers the path of the vehicle on the desired path in the lane.

Figure 3:
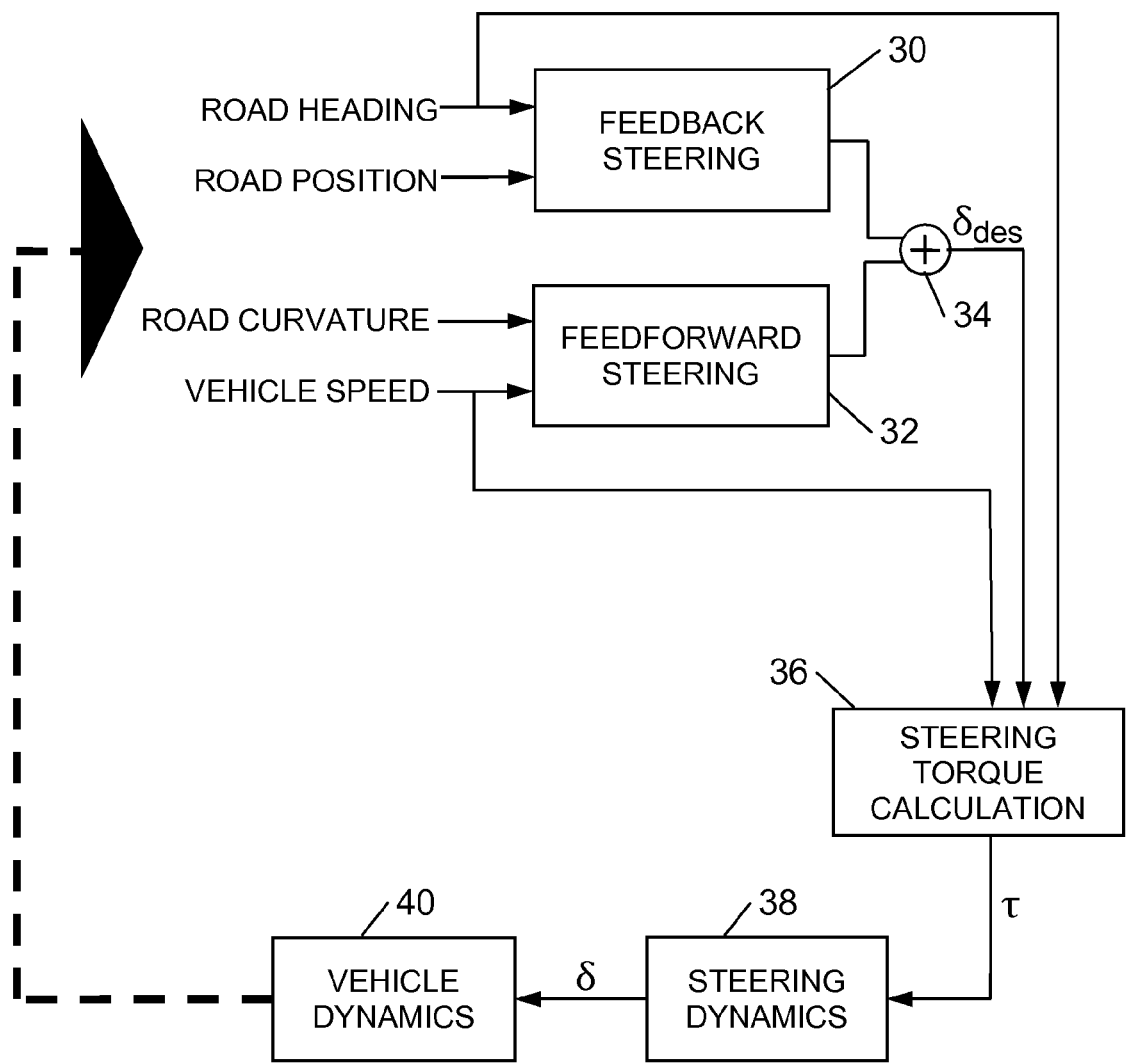
FIG. 3 is a schematic diagram of an exemplary system architecture of a lanekeeping assistance system that operates in accordance with the invention.

The basic operation of a lanekeeping assistance is described with reference to FIG. 3. FIG. 3 is a schematic diagram of an exemplary system architecture of a lanekeeping assistance system that operates in accordance with the invention. The torque acting on the steering column of the vehicle is the result of torques from several sources, which can be calculated in accordance with the invention. These torque sources are combined to create a total torque acting on the steering column. More specifically, road characteristics information, which includes road heading information and road position information, is supplied to a feedback steering block 30. Road curvature information and vehicle speed information are supplied to a feedforward steering control 32. The output of the feedback steering block 30 and the output of the feedforward steering block 32 are supplied to an adder 34 where the output from the feedback steering block 30 and from the feedforward steering block 32 are combined to form a desired steering angle $\delta_{des}$. The output of the adder 34 supplies the desired steering angle $\delta_{des}$ to a steering torque calculation block 36.

The steering torque calculation block 36 receives information about the desired steering angle $\delta_{des}$ as well as road characteristics information and vehicle speed and position information. The steering torque calculation block 36 calculates a steering torque $\tau$. The calculation of the steering torque $\tau$ is explained in more detail below. The calculated steering torque $\tau$ is then used to control the steering system of the vehicle by, for example, adding a steering assist torque in order to keep the vehicle centered on a desired path in the lane. Based on the calculated steering torque $\tau$, the steering dynamics block 38 produces a steering angle $\delta$ which corresponds to a specific path in the lane. The term steering torque is in this case understood as a comprehensive term that may include any torque that is directly related to forces acting in the steering system, among others including forces acting on the tires, such as the lateral forces that cause an aligning torque, forces related to the inertia and damping of the steering system and forces related to the steering geometry.

The steering angle $\delta$ can be determined by any suitable conventional method and need not be described in detail. As the vehicle drives along in its path, the road characteristics, the steering angle $\delta$ and the vehicle dynamics 40 ultimately cause changes in the input variables for the feedback steering block 30 and the feedforward steering block 32. Since the road characteristics change as a function of the vehicle's changing position and orientation, new calculation results for the torque $\tau$ and the steering angle $\delta$ are provided by the lanekeeping assistance system.

As can be seen in FIG. 3, the desired steering angle $\delta_{des}$ is determined from information including lane or road position information, heading information, road curvature information, and vehicle speed information. The desired steering angle can be determined by using conventional methods. In accordance with the exemplary method illustrated in FIG. 3, two sources are used to determine the desired steering angle, namely a feedforward steering block 32 and a feedback steering block 30. The feedforward steering calculation is based on the geometric characteristics of the road and the vehicle speed, as well as the characteristics of the vehicle. The steering angle provided by the feedforward steering block 32 is the steering angle that would be required if the model of the vehicle were perfect. The feedforward steering calculation does not depend on the actual position of the vehicle in the lane. The feedback steering calculation on the other hand depends on the position of the vehicle within the lane.

The main aspect of the invention concerns the method of calculating the steering torque and modifying the mechanical sources of steering torques. The mechanical sources of steering torque are modified in order to create a tendency for the vehicle to stay near the center of the lane or to stay close to an intended or desired path. In other words, the mechanical sources of steering torque are modified such that instead of the torque acting on the steering wheel being zero when the vehicle is traveling straight ahead, the torque acting on the steering wheel is zero when the vehicle is travelling along its intended path in the lane. As mentioned before, the intended path in the lane, which is the desired path for the vehicle, and a corresponding steering angle $\delta_{des}$ can be calculated in a conventional manner and need not be described in detail. FIG. 3 illustrates the general setup for a lanekeeping system where a desired steering angle $\delta_{des}$ is calculated from road characteristics and the vehicle's position and speed.

The method according to the invention mainly concerns the calculation of the torque $\tau$ that is applied to the steering system once the desired steering angle $\delta_{des}$ is determined. This steering angle $\delta_{des}$ corresponds to a specific path in the lane and can in principle be determined in accordance with any conventional method. The method according to the invention modifies the sources of steering torque in a mechanical system such that the steering system is centered on the intended path in the lane. In other words, the sources of steering torque are modified such that the driver does not have to apply a torque on the steering wheel in order to remain on the intended path in the lane.

Mechanical sources of steering torque include the jacking torque, the aligning torque and torques due to inertia of masses and damping as a result of friction. The jacking torque and the aligning torque cause the steering wheel to return to its neutral position. The jacking torque is dependent on the steering geometry, more specifically on the lateral offset and inclination angle of the steering axis. The jacking torque is the result of the lifting of the vehicle that occurs when steering to the left or to the right. The aligning torque is caused by the offset between the steering axis and the application point of the tire side force in the tire contact patch. The aligning torque is dominant at high speeds whereas the jacking effect dominates at low speeds and large steering angles. These mechanical sources of steering torque influence the steering feel of conventional steering systems and drivers are familiar with the steering feel that is caused by these steering torques. For example, drivers are familiar with the steering wheel's tendency to return to its neutral position such that a vehicle drives straight ahead when the driver takes his or her hands off the steering wheel. This tendency of the steering wheel to return to its neutral position is caused by the jacking torque and the aligning torque.

Drivers expect a steering system to behave such that the steering wheel returns to a neutral position and therefore drivers expect a certain amount of jacking torque and aligning torque to be present when the steering wheel is not in its neutral position. This familiarity of drivers with torques that exist in conventional steering systems can advantageously be used for the purpose of providing a lanekeeping assistance. If, for example, the jacking torque is modified such that the steering wheel maintains a steering angle that is slightly different from its straight ahead position, then the lanekeeping assistance is neither intrusive nor disruptive because the torque is added such that the added torque feels like the familiar jacking torque to the driver.

The jacking torque $\tau_{jack}$ is a result of the complex three-dimensional kinematics of the steering system, but can be approximated as a linear function of the steering angle in accordance with the following equation in which $K_{jack}$ denotes a property of the steering geometry and $\delta$ denotes the steering angle.

$$\tau_{jack} = -K_{jack}\delta \qquad (Eq. 1)$$

In a conventional steering system, the jacking torque $\tau_{jack}$ is essentially centered on the neutral position of the steering wheel with a steering angle $\delta$ equal to zero. In contrast, in accordance with the invention, the jacking torque $\tau_{jack}$ is centered on the desired steering angle $\delta_{des}$, so that the modified jacking torque is zero if the steering angle matches the desired steering angle. The following equation defines the modification of the jacking torque for centering the jacking torque on the desired steering angle. The desired jacking torque $\tau_{jack_{des}}$ is zero when the jacking torque $\tau_{jack}$ is centered on the desired steering angle $\delta_{des}$.

$$\tau_{jack_{des}} = -K_{jack}(\delta - \delta_{des}) \qquad (Eq. 2)$$

The steering system of the vehicle has a given jacking torque resulting from the mechanical setup of the steering system. In order to center the jacking torque on the desired steering angle, an extra torque, namely the additional jacking torque $\tau_{jack_{add}}$ needs to be applied as a modification necessary for the lanekeeping assistance.

$$\tau_{jack_{add}} = K_{jack}\delta_{des} \qquad (Eq. 3)$$

In addition to the jacking torque, the aligning torque can also be modified in order to center the steering system on the desired steering angle. The aligning torque results from a side force acting in a lateral direction on the tires of the vehicle. More specifically, the aligning torque results from a side force acting on the tire at a distance (trail) from the steering axis of the wheel. The aligning torque acts on the front tires such that it opposes the steering and causes the steering wheel of a conventional steering system to return to its center position. The aligning torque $\tau_{align}$ can be modeled as being proportional to this side force acting on the tire in accordance with the following equation:

$$\tau_{align} = -K_{align}\left(\frac{\dot{e}}{U_x} - \psi + \frac{ar}{U_x} - \delta\right) \qquad (Eq. 4)$$

Equation (4) defines the aligning torque $\tau_{align}$ as a function of $K_{align}$, the sideways velocity $\dot{e}$ of the vehicle relative to the road lane, the longitudinal speed $U_x$ of the vehicle, the heading angle $\psi$, the distance a from the front axle of the vehicle to the center of gravity CG of the vehicle, the yaw rate r, and the steering angle $\delta$. The steering parameter $K_{align}$ in equation (4) is a function of other steering parameters such as the cornering stiffness of the tires.

In order to provide a lanekeeping assistance, the aligning torque is centered on the desired steering angle and, respectively, on the desired trajectory of the vehicle. Thus, the aligning torque is modified such that it is zero if the vehicle is on the desired trajectory. The desired aligning torque $\tau_{align_{des}}$ can be expressed in the following manner:

$$\tau_{align_{des}} = -K_{align}\left(\frac{\dot{e}}{U_x} - (\psi - \psi_{des}) + \frac{a}{U_x}(r - r_{des}) - (\delta - \delta_{des})\right) \quad \text{(Eq. 5)}$$

Equation (5) defines the desired aligning torque $\tau_{align_{des}}$ as a function of $K_{align}$, which is a function of steering parameters, the sideways velocity or lateral velocity $\dot{e}$ of the vehicle relative to the lane, the longitudinal velocity $U_x$ of the vehicle, the heading angle $\psi$ and the desired heading angle $\psi_{des}$, the distance a between the center of gravity CG of the vehicle and the front axle of the vehicle, the yaw rate r, the desired yaw rate $r_{des}$, the steering angle $\delta$ and the desired steering angle $\delta_{des}$.

In accordance with the invention, torque is added to the steering based on the desired trajectory. The torque $\tau_{align_{add}}$ that needs to be added so that the aligning torque is centered on the desired path or trajectory depends on the parameter $K_{align}$, the longitudinal velocity $U_x$ of the vehicle, the desired heading angle or desired heading deviation $\psi_{des}$, the distance a between the center of gravity CG of the vehicle and the front axle of the vehicle, the desired yaw rate $r_{des}$, and the desired steering angle $\delta_{des}$.

$$\tau_{align_{add}} = -K_{align}\left(\psi_{des} + \frac{a}{U_x}r_{des} - \delta_{des}\right) \quad \text{(Eq. 6)}$$

The desired yaw rate $r_{des}$ can be determined as a function of the desired steering angle $\delta_{des}$, the longitudinal velocity $U_x$ of the vehicle and the distance L in accordance with equation (7), wherein L is the wheelbase of the vehicle, which is the distance between the front axle and the rear axle of the vehicle.

$$r_{des} = \frac{\delta_{des} U_x}{L} \quad \text{(Eq. 7)}$$

The desired heading angle or also called desired heading deviation $\psi_{des}$ depends on the characteristics of the vehicle, including the characteristics of the tires.

$$\psi_{des} = -\frac{C_f[bLC_r - amv^2]}{L^2 C_f C_r - (aC_f - bC_r)mv^2}\delta_{\!f\!f} \quad \text{(Eq. 8)}$$

Equation (8) defines the desired heading angle $\psi_{des}$ as a function of the cornering stiffness $C_f$ of the front tires, the cornering stiffness $C_r$ of the rear tires, wherein the cornering stiffness describes the amount of force the tires generate per radian of slip angle, the distance a from the front axle to the center of gravity CG of the vehicle, the distance b from the rear axle to the center of gravity CG of the vehicle, the wheelbase L of the vehicle as the distance between the front axle and the rear axle, the vehicle mass m, the vehicle velocity v, and a feedforward component $\delta_{\!f\!f}$ of the steering angle correction. The vehicle velocity v and the longitudinal velocity $U_x$ of the vehicle may be substantially the same in normal driving circumstances. For practical purposes, the vehicle velocity v and the longitudinal velocity $U_x$ of the vehicle are therefore in many cases interchangeable in case of normal driving circumstances.

Other mechanical sources of steering torque are the inertia and damping associated with the steering system. The torque acting on the steering system is in this case caused by mechanical effects of the steering system itself. Inertia is caused by the mass of the steering components, tires, and wheels. The inertia of the steering system causes a resistance to quick movements of the steering wheel. Damping is caused by friction in the bushings, joints and bearings. The damping torques or forces cause a resistance to steering wheel movements. The torques resulting from inertia and damping can be modeled as being proportional to the velocity and acceleration of the steering, as is indicated by equation (9).

$$\tau_{effective} = -I_s\ddot{\delta} - C_s\dot{\delta} \quad \text{(Eq. 9)}$$

In equation (9), $\tau_{effective}$ denotes the effective torque caused by inertia and damping. $I_s$ and $C_s$ are parameters defining characteristics of the inertia and, respectively, the damping of the mechanical steering system.

The torques caused by the inertia and the damping of the steering system should not be felt by the driver when the steering wheel is moving in the intended way, which means that the vehicle follows an intended path. Equation (10) defines the desired torque $\tau_{ID_{des}}$ related to inertia and damping.

$$\tau_{ID_{des}} = -I_s(\ddot{\delta} - \ddot{\delta}_{des}) - C_s(\dot{\delta} - \dot{\delta}_{des}) \quad \text{(Eq. 10)}$$

The additional torque $\tau_{ID_{add}}$ that needs to be added in order to make sure that the driver does not feel the torque related to inertia and damping is given by equation (10).

$$\tau_{ID_{add}} = I_s\ddot{\delta}_{des} + C_s\dot{\delta}_{des} \quad \text{(Eq. 11)}$$

Thus, as long as the wheel is turning at the desired rate $d\delta/dt$, there will be no feeling of damping or inertia.

In accordance with the invention, several sources of steering torque that collectively keep the vehicle in the lane are taken into account. The torques $\tau_{jack}$, $\tau_{align}$ and $\tau_{ID}$ are torques that are present in typical conventional steering systems and therefore the driver is familiar with these torques. An advantage of modifying torques that are present in steering systems is that the behavior of the vehicle will feel largely like a normal vehicle, but with the tendency to automatically stay in the lane. Another advantage of modifying torques that are present in steering systems is that the method for modifying torques for the purpose of lanekeeping can be implemented in different vehicles with knowledge of the steering system characteristics in each vehicle.

Since each steering system may have a characteristic steering feel as a result of characteristics of mechanical sources of steering torques and since the method according to the invention only modifies the mechanical sources of the steering torques, the steering feel of the steering system with the lanekeeping assistance remains similar to the characteristic steering feel of a steering system without a lanekeeping assistance. As a result, drivers are more likely to accept a lanekeeping assistance based on the method of the invention as opposed to a conventional lanekeeping assistance whose lanekeeping torques are not perceived as familiar torques of mechanical sources but rather as intrusive or disruptive torques trying to override the driver's steering operation. Further, the characteristic steering feel of a steering system is substantially maintained and thus each steering systems will have a different steering feel based on that vehicle's characteristics.

In accordance with the invention, mechanical sources of force feedback are used for the lanekeeping torque itself. An advantageous result of using mechanical sources of torques for the lanekeeping force feedback is that the method that actually determines the torque necessary for the lanekeeping assistance derives the lanekeeping torques in a manner that provides a steering feel as if these torques came naturally from the characteristics of the vehicle. The lanekeeping torques are perceived by the driver as natural, smooth and predictable forces rather than disruptive forces interfering with the natural steering feel.

The basic operation of a lanekeeping assistance system is described above with reference to FIG. 3. In accordance with an exemplary embodiment, the actuation that is performed in order to provide a lanekeeping torque is achieved by applying a torque with an electric power steering. The electric power steering uses an electric motor that acts on the steering column or the steering rack such that a torque is applied to the steering system for the purpose of keeping the vehicle on a desired path. Instead of using an electric motor of an electric steering system as an actuator that applies a torque, it is also possible to use other methods of actuation. For example, variable ratio gearboxes, electro-hydraulic systems and other devices that can be controlled to apply a torque for lanekeeping purposes may be used.

As is clear from FIG. 2 and FIG. 3, the method for providing a lanekeeping assistance requires knowledge of the vehicle's position with respect to the lane, the heading or orientation of the vehicle relative to the lane, and knowledge of the road curvature. Information relating to the lane position, heading and road curvature may be ascertained with a vision system. The vision system uses a camera that captures a video image of an area in front of the vehicle. The video image is evaluated in order to detect lane markers or lane lines and in order to estimate the lane position, heading and road curvature based on the evaluation of the location and shape of the lane markers. In addition or as an alternative, the lanekeeping assistance system may use a GPS (Global Positioning System) in order to determine the lane position and may use a stored digital map to determine the road curvature. Other alternatives include sensing magnets embedded in the road or in the paint on the road and laser scanners or radar scanners that detect lines on the road.

What is claimed is:

1. A method for providing a lanekeeping assistance, the method which comprises:
    determining road lane characteristics;
    determining a vehicle velocity and a vehicle position;
    calculating a desired steering angle as a function of at least the road lane characteristics;
    providing a lanekeeping torque acting on a steering system of a vehicle as a function of at least the desired steering angle; and
    generating the lanekeeping torque by modifying at least one mechanical steering torque selected from the group consisting of a jacking torque, an aligning torque, an inertia torque and a damping torque.

2. The method according to claim 1, which comprises determining the road lane characteristics by at least determining a road lane curvature.

3. The method according to claim 1, which comprises calculating the desired steering angle as a function of at least the road lane characteristics, the vehicle velocity and the vehicle position with respect to a road lane.

4. The method according to claim 1, wherein the step of determining a vehicle position includes determining a lateral error as a distance between a center of gravity of the vehicle and a desired path of the vehicle and determining a heading angle as an angle between a longitudinal axis of the vehicle and the desired path of the vehicle.

5. The method according to claim 4, which comprises using a road lane centerline as the desired path of the vehicle.

6. The method according to claim 1, which comprises generating the lanekeeping torque such that the steering system of the vehicle guides the vehicle substantially along a desired path.

7. The method according to claim 1, which comprises:
    measuring a steering angle of front wheels of the vehicle; and
    determining the jacking torque as a substantially linear function of the steering angle.

8. The method according to claim 7, which comprises determining the jacking torque by using the following relation:

$$\tau_{jack} = -K_{jack}\delta$$

wherein $\tau_{jack}$ denotes the jacking torque, $K_{jack}$ is a property of a steering geometry of the steering system and $\delta$ denotes the steering angle of the front wheels of the vehicle;
    centering the jacking torque on the desired steering angle in accordance with the following relation:

$$\tau_{jack_{des}} = -K_{jack}(\delta - \delta_{des})$$

wherein $\tau_{jack_{des}}$ denotes a desired jacking torque and $\delta_{des}$ denotes the desired steering angle of the front wheels of the vehicle such that the desired jacking torque is substantially zero if the steering angle substantially matches the desired steering angle and such that an additional jacking torque is generated in accordance with the following relation:

$$\tau_{jack_{add}} = K_{jack}\delta_{des}$$

wherein $\tau_{jack_{add}}$ is the additional jacking torque to be added in order to center the jacking torque on the desired steering angle.

9. The method according to claim 1, which comprises:
    measuring a steering angle of front wheels of the vehicle;
    determining an aligning torque by using the following relation:

$$\tau_{align} = -K_{align}\left(\frac{\dot{e}}{U_x} - \psi + \frac{ar}{U_x} - \delta\right)$$

wherein $\tau_{align}$ denotes the aligning torque, $K_{align}$ is a function of steering parameters, $\dot{e}$ denotes a sideways velocity of the vehicle relative to a road lane, $U_x$ denotes a longitudinal speed of the vehicle, $\psi$ denotes a heading angle as an angular difference between a longitudinal axis of the vehicle and a desired path, a is a distance between a front axle of the vehicle and a center of gravity of the vehicle, r denotes a yaw rate of the vehicle and, and $\delta$ denotes the steering angle.

10. The method according to claim 9, which comprises centering the aligning torque on the desired steering angle, a desired heading angle, and a desired yaw rate in accordance with the following relation:

$$\tau_{align_{des}} = -K_{align}\left(\frac{\dot{e}}{U_x} - (\psi - \psi_{des}) + \frac{a}{U_x}(r - r_{des}) - (\delta - \delta_{des})\right)$$

wherein $\tau_{align_{des}}$ is a desired aligning torque, $\psi_{des}$ denotes the desired heading angle, $r_{des}$ denotes the desired yaw rate of the vehicle, and $\delta_{des}$ denotes the desired steering angle.

11. The method according to claim 10, which comprises calculating an additional aligning torque by using the following relation:

$$\tau_{align_{add}} = -K_{align}\left(\psi_{des} + \frac{a}{U_x}r_{des} - \delta_{des}\right)$$

wherein $\tau_{align_{add}}$ is the additional aligning torque to be added for providing a lanekeeping assistance.

12. The method according to claim 10, which comprises determining the desired yaw rate in accordance with the following relation:

$$r_{des} = \frac{\delta_{des}U_x}{L}$$

wherein L is a distance between the front axle of the vehicle and a rear axle of the vehicle.

13. The method according to claim 10, which comprises determining the desired heading angle by using the following relation:

$$\psi_{des} = -\frac{C_f[bLC_r - amv^2]}{L^2 C_f C_r - (aC_f - bC_r)mv^2}\delta_{ff}$$

wherein $C_f$ is a cornering stiffness of front wheels of the vehicle, $C_r$ is a cornering stiffness of rear wheels of the vehicle, L is a distance between the front axle of the vehicle and a rear axle of the vehicle, b is a distance between the center of gravity of the vehicle and a rear axle of the vehicle, m is a total mass of the vehicle, v is a velocity of the vehicle and $\delta_{ff}$ is a feedforward component of a steering angle correction.

14. The method according to claim 1, which comprises: measuring a steering angle of front wheels of the vehicle; determining an inertia and damping torque acting on the steering system of the vehicle by using the following relation:

$$\tau_{effective} = -I_s\ddot{\delta} - C_s\dot{\delta}$$

wherein $\tau_{effective}$ is the inertia and damping torque resulting from an inertia of masses of the steering system and resulting from friction in the steering system, $I_s$ and $C_s$ are parameters defining characteristics of an inertia and, respectively, a damping of the steering system and $\delta$ is the steering angle of the front wheels of the vehicle.

15. The method according to claim 14, which comprises determining a desired inertia and damping torque such that an inertia and damping torque acting on a steering wheel of the vehicle is substantially eliminated when the steering wheel turns at a desired rate.

16. The method according to claim 15, which comprises calculating the desired inertia and damping torque by using the following relation:

$$T_{ID_{des}} = -I_s(\ddot{\delta} - \ddot{\delta}_{des}) - C_s(\dot{\delta} - \dot{\delta}_{des})$$

wherein $\tau_{ID_{des}}$ is the desired inertia and damping torque and $\delta_{des}$ is a desired steering angle.

17. The method according to claim 16, which comprises calculating an additional inertia and damping torque by using the following relation:

$$\tau_{ID_{add}} = I_s\ddot{\delta}_{des} + C_s\dot{\delta}_{des}$$

wherein $\tau_{ID_{add}}$ add is the additional inertia and damping torque to be added in order to substantially eliminate an inertia and damping torque acting on the steering wheel of the vehicle when the steering wheel turns at a desired rate.

18. The method according to claim 1, which comprises calculating an additional steering torque $\tau_{add}$ by adding a number of steering torque components wherein the steering torque components collectively keep the vehicle substantially on a desired path and wherein the steering torque components include at least an additional jacking torque component $\tau_{jack_{add}}$, an additional aligning torque component $\tau_{align_{add}}$ and an additional inertia and damping torque component $\tau_{ID_{add}}$.

* * * * *